United States Patent
Järvinen et al.

[11] Patent Number: 6,021,385
[45] Date of Patent: Feb. 1, 2000

[54] SYSTEM FOR DETECTING DEFECTIVE SPEECH FRAMES IN A RECEIVER BY CALCULATING THE TRANSMISSION QUALITY OF AN INCLUDED SIGNAL WITHIN A GSM COMMUNICATION SYSTEM

[75] Inventors: Kari Järvinen, Tampere; Janne Vainio, Sääksjärvi, both of Finland

[73] Assignee: Nokia Telecommunications Oy, Espoo, Finland

[21] Appl. No.: 08/809,675

[22] PCT Filed: Sep. 19, 1995

[86] PCT No.: PCT/FI95/00510

§ 371 Date: Mar. 19, 1997

§ 102(e) Date: Mar. 19, 1997

[87] PCT Pub. No.: WO96/09704

PCT Pub. Date: Mar. 28, 1996

[30] Foreign Application Priority Data

Sep. 19, 1994 [FI] Finland .................................... 944345

[51] Int. Cl.$^7$ ................ G01L 9/00; H04B 13/02
[52] U.S. Cl. .................. 704/219; 704/230; 455/226.1; 375/224; 375/227; 371/20.1; 371/37.2; 371/68.2
[58] Field of Search .................. 371/20.1, 37.2, 371/68.2; 455/226.1, 226.2; 375/224, 227; 704/219, 230

[56] References Cited

U.S. PATENT DOCUMENTS

| | | | |
|---|---|---|---|
| 3,934,224 | 1/1976 | Dulaney et al. | 375/224 |
| 4,428,076 | 1/1984 | Schuon | 375/224 |
| 4,542,514 | 9/1985 | Watanabe | 375/224 |
| 5,073,940 | 12/1991 | Zinser et al. | 381/47 |
| 5,255,343 | 10/1993 | Su | 704/231 |
| 5,471,671 | 11/1995 | Wang et al. | 455/226.2 |
| 5,497,383 | 3/1996 | Thome et al. | 371/43 |
| 5,526,366 | 6/1996 | Jarvinen et al. | |
| 5,557,639 | 9/1996 | Heikkila et al. | 375/224 |
| 5,598,431 | 1/1997 | Lobel | 375/224 |
| 5,751,767 | 5/1998 | Tatsumi | 375/224 |
| 5,784,406 | 7/1998 | DeJaco et al. | 375/224 |
| 5,796,777 | 8/1998 | Terlep et al. | 455/226.2 |

FOREIGN PATENT DOCUMENTS

| | | |
|---|---|---|
| 542 065 | 5/1993 | European Pat. Off. . |
| 664 536 | 7/1995 | European Pat. Off. . |

OTHER PUBLICATIONS

Abstract EP 542065 A2.

*Primary Examiner*—David R. Hudspeth
*Assistant Examiner*—Vijay B. Chawan
*Attorney, Agent, or Firm*—Pillsbury Madison & Sutro LLP

[57] ABSTRACT

A method for detecting defective speech frames in a receiver of a speech communication system includes a coded speech signal consisting of speech frames conveying speech coding parameters received through a transmission link. The detection method for defective speech frames depends on the quality of the transmission link. If the quality of the transmission link is "poor", unusual parameter values of a speech signal in a speech frame are interpreted as transmission errors, and the speech frame is classified as defective. During a transmission link of "good" quality, all received parameter values possible for speech are accepted and forwarded to a speech decoder. In the latter mode of operation, the detection of defective speech frames is solely based on conventional error detection methods employed in the receiver.

11 Claims, 2 Drawing Sheets

PRIOR ART

SYSTEM FOR DETECTING DEFECTIVE SPEECH FRAMES IN A RECEIVER BY CALCULATING THE TRANSMISSION QUALITY OF AN INCLUDED SIGNAL WITHIN A GSM COMMUNICATION SYSTEM

This application is the national phase of international application PCT/FI95/00510 filed Sep. 19, 1995 which designated the U.S.

FIELD OF THE INVENTION

The present invention relates to a method for detecting defective speech frames in a receiver of a digital speech communication system.

BACKGROUND OF THE INVENTION

In digital speech communication systems, the transmission link causes transmission errors which deteriorate the quality of the speech signal in the receiver. In order to provide protection against interference due to the transmission errors, an error correction coding is utilized for the signal transmitted on the transmission link in order to correct the errors that occur, or at least to detect them. In many digital communication systems, speech coding methods that take the special characteristics of speech into account and slow down transmission rate are required due to capacity limits on the transmission link. The Pan-European mobile communication system GSM (Global System for Mobile Communications), for example, uses a RPE-LTP (Regular Pulse Excitation—Long Term Prediction) speech coder, which utilizes both short and long term prediction. Log Area Ratio (LAR), RPE, and LTP parameters for speech transmission are produced by the RPE-LTPE coding. In communication systems, such as the GSM which use speech coding, the most important speech coding parameters as far as the quality of speech is concerned, and, in addition, the most significant bits from most of speech coding parameters of less importance, are protected by error correction coding. In addition, the most important bits are associated with an error verification code used to detect errors which the actual error correction coding is not able to correct. The receiver, however, is not able to detect all transmission errors that have not been corrected. For this reason, defective speech frames, i.e., speech frames whose speech coding parameters include erroneous parameter values, are occasionally input to the speech decoder of the receiver. As a consequence, the quality of the received speech signal is deteriorated by these erroneous parameters.

If the transmission link is of a fairly high quality, the error correction capability is usually adequate to correct the errors which are caused by the transmission link in the speech signal. If the transmission link, instead, is of poor quality, due to a low field strength in a border area between two base stations of a mobile communication network, or in an area shadowed by terrain, for example, the correction capability of the error correction and the error detection capability may be exceeded. Consequently, it is possible that some of defective frames are interpreted as correct. If such defective frames are used in the speech decoding, the defective frames cause disturbance to the audible speech, and thus, deteriorate the quality of the speech signal. Disturbances caused by defective speech parameters which are classified as correct in the receiver, but which, in fact, are defective, constitute a problem in communication systems, especially during a relatively poor quality transmission link.

SUMMARY OF THE INVENTION

It is an object of the present invention to decrease disturbances in the speech decoder during a poor quality transmission link and to achieve a higher speech quality during a poor quality transmission link.

This object is achieved by the method according to the invention for detecting defective speech frames in a receiver of a speech communication system. The method includes determining the quality of the transmission link, and detecting defective speech frames dependent on the quality of the transmission link by A) checking the values of received speech coding parameters during a relatively low quality transmission link and interpreting the speech frame as defective when the speech coding parameter values are unusual according to predetermined criteria, but nevertheless values that are possible and occur occasionally in the speech signal, and B) accepting all the values possible for the speech signal as correct and interpreting the speech frame as correct during a relatively high quality of the transmission link.

The invention also relates to a receiver of a speech communication system for a speech signal which includes speech frames including speech coding parameters, the receiver includes a detector for detecting defective speech frames and a speech decoder. The receiver also includes a quality measurer which determines the quality of a transmission link, and an error detector, responsive to a relatively low quality of the transmission link, for checking the values of received speech coding parameters and interpreting the speech frame as defective, if the speech parameter values are unusual according to predetermined criteria but nevertheless values that are possible and occur occasionally in the speech signal, and responsive to a relatively high quality of the transmission link, for interpreting all the values possible for a speech signal as correct, and defining the speech frame as correct.

In the invention, the detection method for defective speech frames depends on the quality of the transmission link so that, if the quality of the transmission link is poor, i.e., very low, unusual parameter values of a speech signal in a speech frame are interpreted as having been caused by transmission errors in the transmission link, and the speech frame is classified as defective. The invention is based on the idea that during a transmission link of relatively low quality, it is probable that the performance of the error correction will be exceeded and the unusual parameter values are a result of transmission errors. In such a case, it is advantageous to carry out a pessimistic interpretation in the receiver, and to classify as defective, all speech frames that contain unusual parameter values. This method, due to the pessimistic interpretation, naturally rejects some correct frames when they contain unusual parameter values. At the same time, however, defective speech frames, more critical as far as the speech quality is concerned, can also be detected and their use in speech decoding can be blocked. During a transmission link of relatively high quality, unusual parameter values are almost certainly caused by the coding of the speech signal, and thus, originate in the original speech, and not in the transmission errors caused by the transmission link.

During a transmission link defined to be of relatively high quality, all parameter values possible for speech are in fact accepted in the method of the invention to have been caused by speech coding, and they are transmitted to a speech decoder. In other words, in case of a relatively high quality transmission link, the method of the invention does not infer that the frame is defective on the basis of parameter values which are possible and allowed, but rare for a speech signal. In such a case, all the parameter values received are accepted for use in speech decoding, and the detection of received defective speech frames is solely based on any other error detection methods possibly employed by the receiver, which methods do not define a speech frame as defective on the basis of parameter values of a speech signal. The present invention could, in fact, be referred to as a method which is started during a relatively poor quality transmission link for detecting poor quality frames, and which is advantageously intended to be used with some other error correction coding method in order to improve the performance of a digital transfer system conveying speech signal. The information required by the invention on the quality of the transmission link can be determined, for example, by means of a ratio between the number of previous defective and correct speech frames, or by means of another appropriate method.

According to the invention, the transmission link quality may have several quality levels determined for it, so that each quality level comprises different criteria for the deviation allowed to the values of the speech coding parameters from the "normal" values before they are considered to be an indication of a transmission error.

The quality of the transmission link may control the operation of the error detection method of the invention so that the lower the overall quality of the transmission link the lower the criteria for the decision on the defectiveness of speech frames on the basis of unusual parameter values.

BRIEF DESCRIPTION OF THE DRAWINGS

In the following, the invention will be described in closer detail by embodiments with reference to the accompanying drawings in which.

DETAILED DESCRIPTION OF CURRENTLY PREFERRED EMBODIMENTS OF THE INVENTION

The error detection method according to the invention can be applied to any digital communication system which transmits a speech signal coded at the transmitting end by any suitable speech coding method to the form of speech coding parameters for transmission over the transmission link, and which is decoded in the receiver by means of the transmitted speech coding parameters into a synthesized speech signal. As far as the present invention is concerned, it is not important which speech coding method is used, as the invention is based on monitoring unusual values of speech parameters within a speech signal. The unusual speech parameter values can be determined specifically for each speech coding method, for each speaker and/or for each transmission link, and consequently, the speech coding method employed has no relevance to the basic idea of the invention. For this reason, there is no need to describe any specific speech coding method in closer detail in this application. However, the RPE-LTP method employed by the GSM mobile communication system is mentioned. The specific structure of the transmission frames, i.e., speech frames, used for transmission of speech coding parameters is not essential as far as the present invention is concerned, as the invention focuses on monitoring speech parameters transmitted within them. The specific structure of a speech frame may freely vary depending on the communication system and the transmission link, and therefore no special structure of a speech frame will be described herein. However, as an example of a prior art speech frame, the TRAU frame of the GSM mobile communication system is mentioned, whose use in speech transmission is described in the GSM recommendation 08.60 (Inband control of remote transcoders and rate adaptors). The transmission of speech frames is usually associated with some kind of existing error detection and error correction method used for the purpose of detecting defective speech frames. The detection method of defective speech frames in accordance with the present invention is totally independent of the type of the prior art detection method employed by a communication system, and it is intended to be used as an addition to said prior art method in order to improve the performance of the communication system during a poor quality transmission link. The prior art method can, however, be utilized in defining the quality of the transmission link, as will be explained below. It is not, however, necessary in this patent application to describe any one prior art method for detecting and correcting defective speech frames. The invention can be applied to the GSM mobile communication system. For error correction coding, the GSM system employs convolution coding having a convolution depth of K=5, and for error correction, a three-bit CRC check sum is employed. Error detection and identification of defective frames are defined in the GSM recommendation 05.03 (Channel coding).

Figure 1:
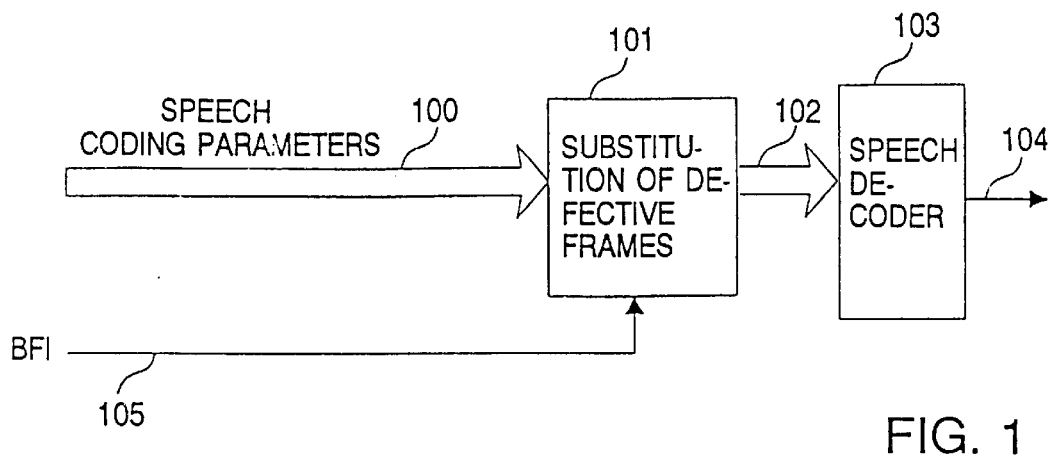
FIG. 1 shows a schematic block diagram of a prior art receiver of a communication system.

FIG. 1 shows a block diagram illustrating, on a schematic level, a prior art method for the processing of speech coding parameters in the receiver of a digital communication system. Speech coding parameters 100 received over the transmission link, as well as indication of the defectiveness/correctness BFI (Bad Frame Indication) 105 inferred by the prior art error correction coding employed in the communication system or of some other method, are applied to substitution block 101 of defective speech frames. In GSM system, indication of defectiveness/correctness of speech frame is obtained by using a CRC check sum. By using any suitable method, block 101 carries out the substitution of speech coding parameters, when the defective/correct indication 105 indicates the speech frame to be defective. The input to the speech decoder 103 is either the received speech coding parameters 100 or the substitute parameter values output from the substitute block 101 of defective frames. From the speech coding parameters 102, a synthesized speech signal 104 is produced in the speech decoder 103.

Figure 2:
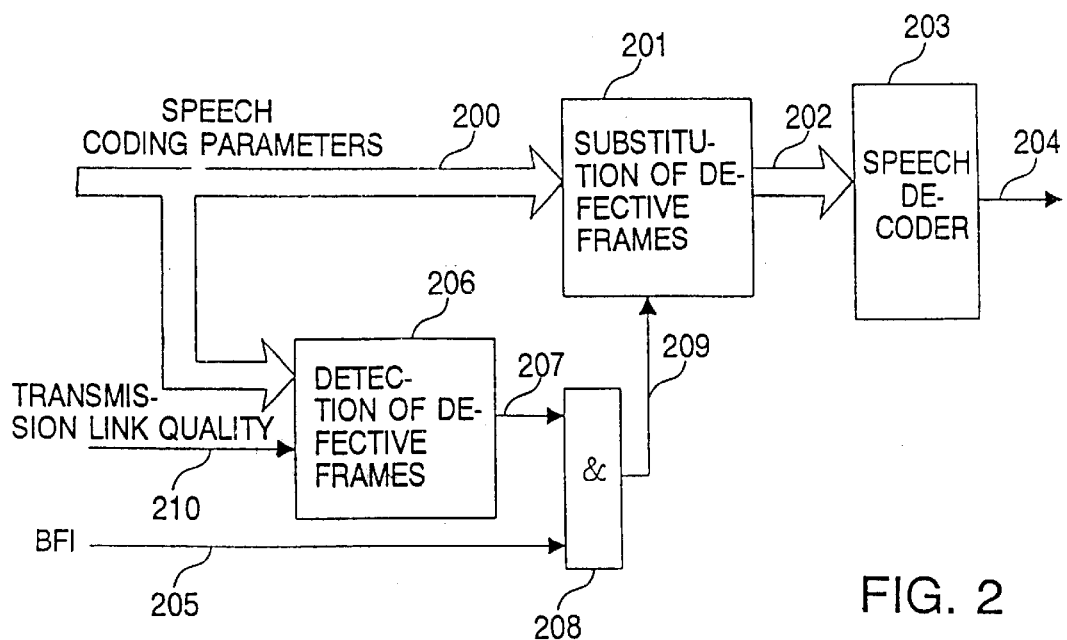
FIG. 2 shows a schematic block diagram of a receiver of a communication system according to the invention.

FIG. 2 shows a schematic block diagram of a receiver according to the present invention. The speech coding parameters 100 received from the transmission is link are applied to the substitution block 201 of defective speech frames, and, also, to the detection block 206 of defective speech frames. Another input of the block 206 is signal 210 which indicates the transmission link quality on at least two levels, i.e., good quality and poor quality. The output signal 207 from block 206 is applied to an input of AND gate 208. Indication BFI 205 of the defectiveness/correctness of the speech frame, provided by the error correction coding employed by the digital communication system, or determined by some other way, is applied to another input of AND gate 208. The block 201 is controlled by the output signal 209 from the AND gate 208. Depending on control signal 209, speech coding parameters 202, which are outputted by block 201 to the speech decoder 203, are either the received speech coding parameters 200, or the substitute parameter values produced by block 201. The substitution of defective frames can be carried out by any prior art substitution method of defective frames. One of such methods is described in the GSM recommendation 06.11 (Substitution and muting of lost frames for full-rate speech traffic channels). By the speech coding parameters 202, a synthesized speech signal 204 will then be produced at speech decoder 203.

The operation of block 206 is based on the method of the invention for detecting defective speech frames by means of speech coding parameters 200 so that the detection method depends on the transmission link quality, which is indicated by signal 210. The method is based on the idea that during a poor quality transmission link, it is appropriate to define as defective all speech parameter values that even slightly appear to be potential defective values. The error detection method of the invention employed by block 206 is intended to be used along with10 the use of error indication 205 provided by conventional error detection methods, as will be explained below.

Block 206 interprets the speech frame as defective, if values, according to criteria determined by the quality of the transmission link, unusual but possible for a speech signal are received in the received speech coding parameters 200. In case block 206 detects a defective speech frame, it sets signal 207 to state "0" whereby also the output 209 of AND gate 208 is in state "0". This indicates to bad frame substitution block 201 that the received speech frame is defective and cannot be used for speech decoding. The output 209 of AND gate 208 is in state "0" indicating a defective speech frame also if error indication 205 obtained from elsewhere in the receiver is in mode "0" indicating that the speech frame is defective, based on, for example, a check sum calculated for each speech frame. In other words, the operation of substitution block 201 of defective speech frames is controlled so that the speech coding parameters received from the transmission link are substituted for other speech parameters, if at least one of signals 205 and 207 indicates a defective speech frame.

When signal 210 indicates a good quality transmission link, i.e., when the quality of the transmission link is at the highest possible level in the quality classification by the method according to the invention, block 206 utilizes for detection of defective frames such criteria in which all possible speech coding parameters possible for a speech signal are accepted as correct values. In practice, the consequence is that the values of the received speech coding parameters will not be checked by the block 206 but the output 207 of the block 206 is maintained in state "1" as long as the transmission link is of good quality. In such a case, the operation of the defective frame substitution block 201 is only controlled by defect indication signal 205 which is produced by a prior art detection method of defective frames employed in the receiver. This prior art method does not recognize a speech frame as defective on the basis of parameter values of the speech signal, contrary to the detection method according to the present invention.

The quality of the transmission link, which controls the method of the invention, and which is indicated by the signal 210, may be determined by any suitable method. The determining of the quality of the transmission link may, for example, be based on the indications of the defectiveness/correctness of the previous single speech frames by taking into account a number (typically, approximately 10) of speech frames preceding the one being examined, or by classifying the quality of the transmission link by state-machine solutions which are based on indications of the defectiveness/correctness of the previous frames. Such a state-machine solution is described in the Finnish patent application 940331. The quality of the transmission link may, apart from being based on error indications of individual speech frames, also be defined by means of, for example, signals from radio sections of the mobile communication system. In such a case, the defining of the transmission link quality can, for example, be based on the receive level (field strength) of the signal received over the radio path, bit error ratio of the received signal, or any other measurement which is carried out by the radio section of the receiver, and which indicates the quality of the transmission link. Generally speaking, it is only essential to the present invention that there is available an information on the quality of the transmission link in the communication system. In order to obtain this information, any suitable method can be utilized.

In the defective frame detection method according to the invention, the quality of the transmission link may be defined as a quality classification comprising more than two levels whereby on each level of the quality classification, different criteria may be used for the decision on which values of speech correction parameters indicate the speech frame to be defective. On the basis of unusual values of speech coding parameters, a decision on the defectiveness of the speech frame is the easier done the lower the quality of the transmission link is in the quality classification.

In a first embodiment of the invention, the method has been implemented so that there are a number of threshold values for various speech coding parameters in conjunction with each level of the quality classification. For each value of the speech coding parameter, these threshold values indicate the highest deviation allowed to these parameter values in order to be still defined as correct. The threshold values may be stored in the memory (in block 206) of the receiver as a table. The decision that the speech frame is defective is made, if a speech coding parameter shows a value which is clearly unusual on the basis of these threshold values. A similar decision may also be made, if the meter jointly produced by the parameters and determined for the communication system for indicating the total deviation of several parameters from normal values indicates the speech frame to be defective. The criteria used on each level of the quality grading may in the method of the invention also be adaptive according to the received speech signal in a speaker specific manner, so that unusual parameter values are explicitly defined on the basis of the deviation from the most common parameter values of a speech signal received during each transmission link.

Figure 3:
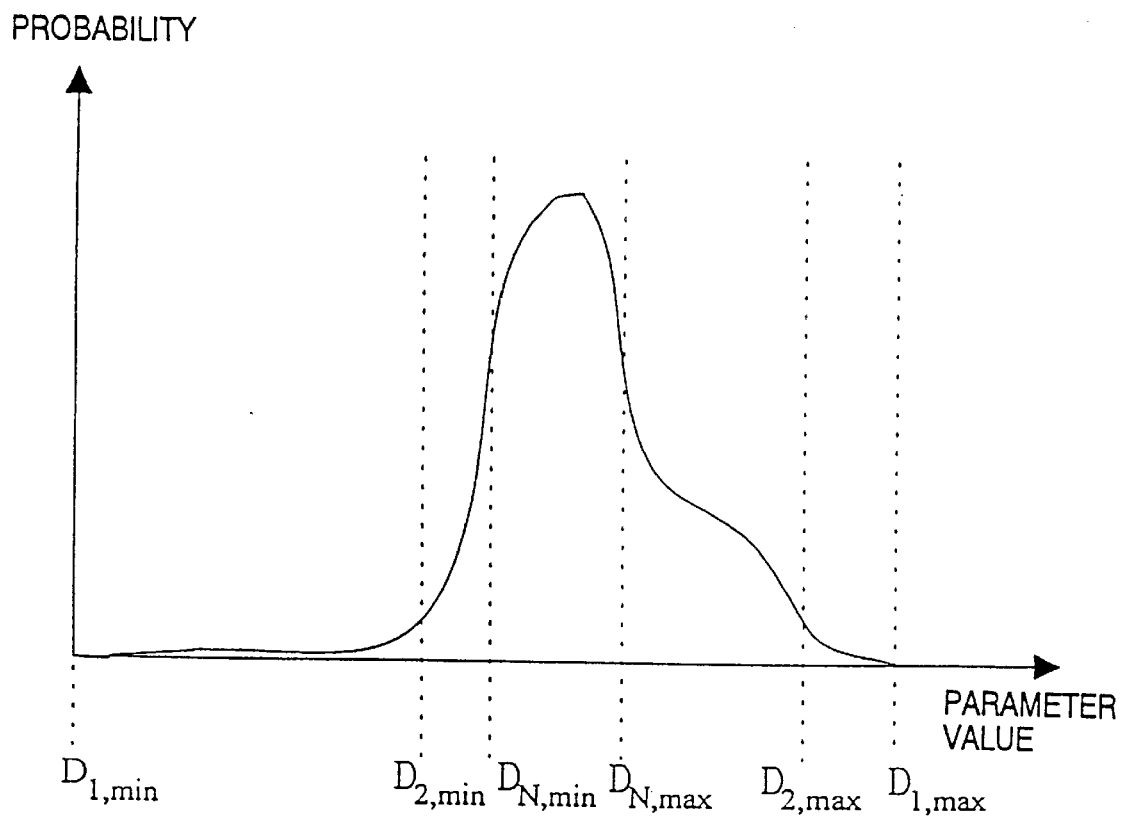
FIG. 3 shows a schematic graph on the distribution of parameter values of a speech decoder.

FIG. 3 illustrates decision making which is based on different kinds of is criteria involved with a multi level quality classification of a transmission link in a case of N-level quality classification. FIG. 3 shows a schematic distribution of a single speech coding parameter. The distribution depicts the probability of values for a speech parameter of a typical speech signal. The distribution shows that there are such parameter values that occur often in the coding system (for example, the values between $D_{N,min} \ldots D_{N,max}$). In the GSM system, the method according to the present invention can successfully be utilized in the detection of defective speech frames from the values of LAR parameters. The LAR parameters of the RPE-LTP speech coder are very unequally distributed, as in FIG. 3. The method of the invention is applied on the speech coding parameter illustrated so that the received parameter values are interpreted as having been caused by transmission errors and, thus, as an indication of a transmission error in case the values fall outside of the allowed range. According to the present invention, the allowed ranges can be defined to be dependent on the transmission link quality, for example, as follows:

TABLE 1

| transmission link quality | allowed range for parameters (min, max) |
|---|---|
| quality 1 (best quality) | $D_{1,min}$, $D_{1,max}$ |
| quality 2 | $D_{2,min}$, $D_{2,max}$ |
| quality 3 | $D_{3,min}$, $D_{3,max}$ |
| . | . |
| . | . |
| . | . |
| quality N (poorest quality) | $D_{N,min}$, $D_{N,max}$ |

Thus, in this exemplary case, the quality of the transmission link is defined by means of N quality levels so that quality 1 is the quality level of the best quality transmission link, and quality N is the quality level of the poorest quality transmission link. The permitted range for the parameter values is according to the invention such that the poorer the transmission link has been defined the easier unusual values are interpreted as an indication of a transmission error, i.e., of a defective speech frame. As can be seen in the above table and FIG. 3, this is in practice achieved by allowing the entire value range $D1_{1,min} \ldots D_{1,max}$ sax in the case of the best quality level, but in the case of the poorest quality level, only a very narrow value range $D_{N,min} \ldots D_{N,max}$ within the parameter value most commonly falls, is accepted. If a parameter value is received which is not within the allowed range, the received speech frame is classified as defective in the defective frame detection block 206.

The figures and their description are only intended to illustrate the present invention. The method and receiver of the invention may vary in details within the scope and spirit of the attached claims.

We claim:

1. A method for detecting defective speech frames in a receiver of a speech communication system, comprising
   receiving a coded speech signal comprising speech frames conveying speech coding parameters through a transmission link;
   detecting defective speech frames;
   determining a quality of said transmission link;
   detecting defective speech frames dependent on said quality of said transmission link by A) checking values of received speech coding parameters during a relatively low quality transmission link and interpreting the speech frame as defective when said speech coding parameter values are unusual according to predetermined criteria but nevertheless values that are possible and occur occasionally in said speech signal, and B) accepting all values possible for said speech signal as correct and interpreting the speech frame as correct during a relatively high quality of said transmission link.

2. The method as claimed in claim 1, wherein said predetermined criteria used to detect defective speech frames depend on said transmission link quality so that the poorer said transmission link quality is the easier the received speech frame is defined as defective.

3. The method as claimed in claim 1, further comprising:
   carrying out in said receiver of a speech coding system, in addition to said method for detecting defective speech frames based on said quality of said transmission link, a detection method of defective speech frames which is independent of said quality of said transmission link, and in which detection of a defective speech frame is not based on parameter values possible for said speech signal is carried out.

4. The method as claimed in claim 3, further comprising:
   utilizing in said receiver of said speech coding system, in case said transmission link quality is defined to be a higher quality transmission link, only said detection method for defective speech frames which is independent of said quality of said transmission link, and in which said detection of said defective speech frame is not based on parameter values possible for a speech signal.

5. The method as claimed in claim 3, further comprising:
   defining said speech frame as defective, if at least one detection method used for detection of defective speech frames indicates the speech frame defective.

6. The method as claimed in claim 5 further comprising:
   substituting upon indication of said speech frame to be defective, said speech parameters in said speech frame by a substitution method.

7. The method as claimed in claim 1, further comprising:
   determining said quality of said transmission link according to a quality classification comprising at least two quality levels, each said quality level employing different criteria for which parameter values indicate said speech frame to be defective so that the lower said transmission link quality, the lower said criteria for a decision on defectiveness of said speech frame based on the unusual parameter values.

8. The method as claimed in claim 6, further comprising:
   adaptively altering said criteria used on each quality level so that unusual parameter values are explicitly defined based on deviation from the most common parameter values of speech signals received during each transmission link.

9. The method as claimed in claim 1, further comprising:
   determining said quality of said transmission link based on defective/correct indications of said speech frame being examined and individual speech frames preceding the one being examined.

10. The method as claimed in claim 1, further comprising:
    determining said quality of said transmission link based on information on said received signal obtained from other sections of said receiver.

11. A receiver for a speech signal including speech frames conveying speech coding parameters, comprising:
    a detector which detects defective speech frames, and a speech decoder;
    a quality measurer which determines a quality of a transmission link;
    an error detector responsive to a relatively low quality of said transmission link, which checks values of received speech coding parameters and which interprets said speech frame as defective, if speech parameter values are unusual according to predetermined criteria, but nevertheless values that are possible and occur occasionally in said speech signal, and responsive to a relatively high quality of said transmission link which interprets all values possible for said speech signal as correct, and which defines said speech frame as correct.

* * * * *